US012670896B2

(12) United States Patent
Nose et al.

(10) Patent No.: US 12,670,896 B2
(45) Date of Patent: Jun. 30, 2026

(54) INFORMATION PROCESSING METHOD, NON-TRANSITORY RECORDING MEDIUM, INFORMATION PROCESSING APPARATUS, AND INFORMATION PROCESSING SYSTEM

(71) Applicants: Masaki Nose, Kanagawa (JP); Akihiro Kato, Kanagawa (JP); Hiroyuki Nagano, Tokyo (JP); Yuuto Gotoh, Kanagawa (JP)

(72) Inventors: Masaki Nose, Kanagawa (JP); Akihiro Kato, Kanagawa (JP); Hiroyuki Nagano, Tokyo (JP); Yuuto Gotoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 421 days.

(21) Appl. No.: 18/091,393

(22) Filed: Dec. 30, 2022

(65) Prior Publication Data

US 2023/0260505 A1      Aug. 17, 2023

(30) Foreign Application Priority Data

Feb. 16, 2022      (JP) ................................. 2022-022169

(51) Int. Cl.
  *G10L 13/08*      (2013.01)
  *G10L 15/06*      (2013.01)
  *G10L 15/30*      (2013.01)
(52) U.S. Cl.
  CPC ............ *G10L 13/08* (2013.01); *G10L 15/063* (2013.01); *G10L 15/30* (2013.01)

(58) Field of Classification Search
  None
  See application file for complete search history.

(56) References Cited

U.S. PATENT DOCUMENTS

| | | | |
|---|---|---|---|
| 2016/0019884 A1* | 1/2016 | Xiao | G10L 15/063 |
| | | | 704/232 |
| 2017/0018270 A1* | 1/2017 | Min | G10L 15/065 |
| 2017/0287465 A1* | 10/2017 | Zhao | G10L 13/08 |
| 2019/0228791 A1* | 7/2019 | Sun | G10L 25/78 |

(Continued)

FOREIGN PATENT DOCUMENTS

| | | |
|---|---|---|
| CN | 108269567 A | 7/2018 |
| CN | 108630190 A | 10/2018 |

(Continued)

OTHER PUBLICATIONS

N. Rossenbach, A. Zeyer, R. Schlüter and H. Ney, "Generating Synthetic Audio Data for Attention-Based Speech Recognition Systems," ICASSP 2020—2020 IEEE International Conference on Acoustics, Speech and Signal Processing (ICASSP), pp. 7069-7073, doi: 10.1109/ICASSP40776.2020.9053008. (Year: 2020).*

(Continued)

*Primary Examiner* — Richemond Dorvil
*Assistant Examiner* — Alexander G Marlow
(74) *Attorney, Agent, or Firm* — XSENSUS LLP

(57) ABSTRACT

An information processing method includes obtaining speech data based on a distance between a sound collection device and a speaker, obtaining text data input in a service for exchanging messages, and outputting first learning data that is based on the speech data and second learning data that includes the text data.

12 Claims, 9 Drawing Sheets

(56) References Cited

U.S. PATENT DOCUMENTS

| | | | | |
|---|---|---|---|---|
| 2019/0237065 A1* | 8/2019 | Xue | ......................... | G10L 15/22 |
| 2019/0385592 A1* | 12/2019 | Shin | ........................ | G10L 15/16 |
| 2020/0111482 A1* | 4/2020 | Chae | ....................... | G06N 3/042 |
| 2020/0175961 A1* | 6/2020 | Thomson | .............. | G10L 15/063 |
| 2020/0403818 A1* | 12/2020 | Daredia | ................. | G06N 3/045 |
| 2021/0174783 A1* | 6/2021 | Wieman | .................. | G10L 13/02 |
| 2021/0304769 A1* | 9/2021 | Ye | ........................... | G10L 15/26 |
| 2023/0098315 A1* | 3/2023 | Roisman | ................. | G10L 13/08 |
| | | | | 704/260 |

FOREIGN PATENT DOCUMENTS

| | | |
|---|---|---|
| CN | 112887875 A | 6/2021 |
| JP | 2010-243914 | 10/2010 |
| JP | 2012-242609 | 12/2012 |
| JP | 2021-076715 | 5/2021 |
| KR | 10-2021-0089347 A | 7/2021 |

OTHER PUBLICATIONS

A. Laptev, R. Korostik, A. Svischev, A. Andrusenko, I. Medennikov and S. Rybin, "You Do Not Need More Data: Improving End-To-End Speech Recognition by Text-To-Speech Data Augmentation," 2020 13th International Congress on Image and Signal Processing, doi: 10.1109/CISP-BMEI51763.2020.9263564. (Year: 2020).*

T. Ko, V. Peddinti, D. Povey, M. L. Seltzer and S. Khudanpur, "A study on data augmentation of reverberant speech for robust speech recognition," 2017 IEEE International Conference on Acoustics, Speech and Signal Processing (ICASSP), New Orleans, LA, USA, 2017, doi: 10.1109/ICASSP.2017.7953152. (Year: 2017).*

Office Action issued Aug. 30, 2025 in Chinese Patent Application No. 202310142707.5, 9 pages.

* cited by examiner

FIG. 4

| SPEECH ID | START TIME | END TIME | SPEECH CONTENT |
|---|---|---|---|
| 001 | 00002.577 | 00003.493 | HE BENDS REALITY TO FIT HOW HE WANTS IT TO BE. |
| 002 | 00003.544 | 00004.154 | I HAVE COVERED NEW YORK BY STAYING FOR 1 WEEK. |
| 003 | 00004.112 | 00004.905 | I PLAY TV GAMES AND OTHER GAMES WITH PC. |
| 004 | 00004.894 | 00005.103 | WE SHOULD DECIDE A LEVEL OF BENEFIT BY CONSIDERING PRICE FLUCTUATIONS. |
| 005 | 00005.081 | 00005.732 | RESCUE OPERATION IS DELAYED BECAUSE THE NUMBER OF AMBULANCES IS NOT ENOUGH. |
| 006 | 00005.497 | 00007.187 | FREEDOM OF SPEECH CAN BE THREATENED A HUNDRED OR A THOUSAND STEPS IF IT YIELDS ONE STEP. |
| 007 | 00007.499 | 00007.785 | AROUND OF THE SITE, THERE ARE HARAJYUKU STATION AND YOYOGI STATION, AND IF YOU WALK A BIT MORE, YOU CAN FIND SHINJYUKUGYOEN STATION. |

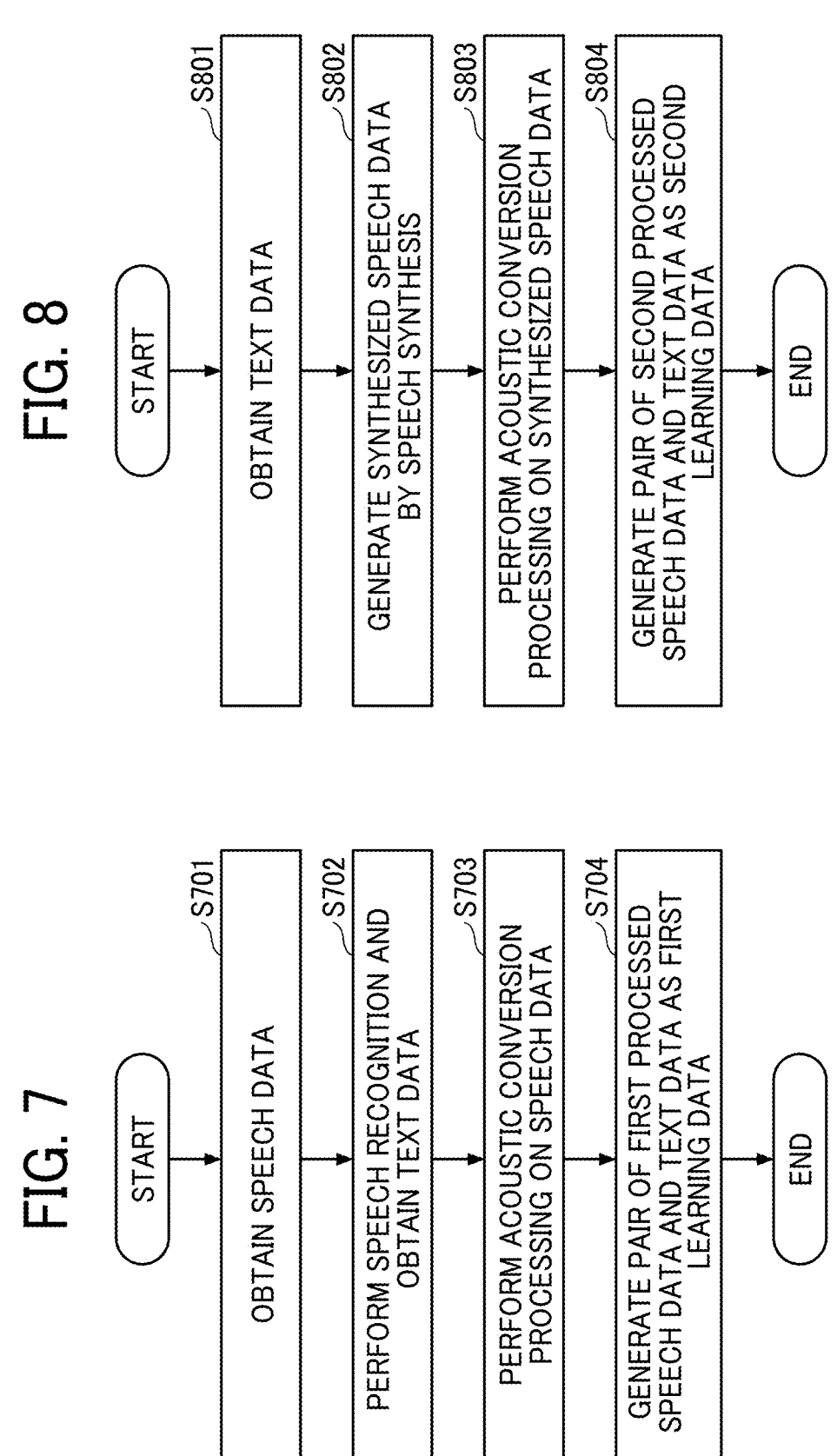

FIG. 8

START

S801 OBTAIN TEXT DATA

S802 GENERATE SYNTHESIZED SPEECH DATA BY SPEECH SYNTHESIS

S803 PERFORM ACOUSTIC CONVERSION PROCESSING ON SYNTHESIZED SPEECH DATA

S804 GENERATE PAIR OF SECOND PROCESSED SPEECH DATA AND TEXT DATA AS SECOND LEARNING DATA

END

FIG. 7

START

S701 OBTAIN SPEECH DATA

S702 PERFORM SPEECH RECOGNITION AND OBTAIN TEXT DATA

S703 PERFORM ACOUSTIC CONVERSION PROCESSING ON SPEECH DATA

S704 GENERATE PAIR OF FIRST PROCESSED SPEECH DATA AND TEXT DATA AS FIRST LEARNING DATA

END

INFORMATION PROCESSING METHOD, NON-TRANSITORY RECORDING MEDIUM, INFORMATION PROCESSING APPARATUS, AND INFORMATION PROCESSING SYSTEM

CROSS-REFERENCE TO RELATED APPLICATION

This patent application is based on and claims priority pursuant to 35 U.S.C. § 119(a) to Japanese Patent Application No. 2022-022169, filed on Feb. 16, 2022, in the Japan Patent Office, the entire disclosure of which is hereby incorporated by reference herein.

BACKGROUND

Technical Field

The present disclosure relates to an information processing method, a non-transitory recording medium, an information processing apparatus, and an information processing system.

Related Art

In recent years, various techniques using speech recognition have been known. For example, there is a technique of performing, with a speech recognizer, speech recognition on speech data of speakers obtained by a desktop microphone provided in a conference room to generate minutes of a conference.

SUMMARY

An embodiment of the present disclosure includes an information processing method including obtaining speech data based on a distance between a sound collection device and a speaker, obtaining text data input in a service for exchanging messages, and outputting first learning data that is based on the speech data and second learning data that includes the text data.

An embodiment of the present disclosure includes a non-transitory recording medium storing a plurality of instructions which, when executed by one or more processors, causes the processors to perform a method. The method includes obtaining speech data based on a distance between a sound collection device and a speaker, obtaining text data input in a service for exchanging messages, and outputting, for learning to be performed, first learning data that is based on the speech data and second learning data that includes the text data.

An embodiment of the present disclosure includes an information processing apparatus including circuitry to obtain speech data based on a distance between a sound collection device and a speaker, obtain text data input in a service for exchanging messages, and output, for learning to be performed the information processing apparatus, first learning data that is based on the speech data and second learning data that includes the text data.

An embodiment of the present disclosure includes an information processing system including an information processing apparatus and a server apparatus. The information processing apparatus includes circuitry to obtain speech data based on a distance between a sound collection device and a speaker, obtain text data input in a service for exchanging messages, and output, for learning to be performed the information processing apparatus, first learning data that is based on the speech data and second learning data that includes the text data. The server apparatus includes server apparatus circuitry to perform the learning using at least one of the first learning data or the second learning data for speech recognition.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a diagram illustrating an example of learning data according to the exemplary embodiment of the disclosure;

FIG. 7 is a flowchart illustrating a process performed by a first learning data generation unit according to the exemplary embodiment of the disclosure;

FIG. 8 is a flowchart illustrating a process performed by a second learning data generation unit according to the exemplary embodiment of the disclosure;

Figure 1:
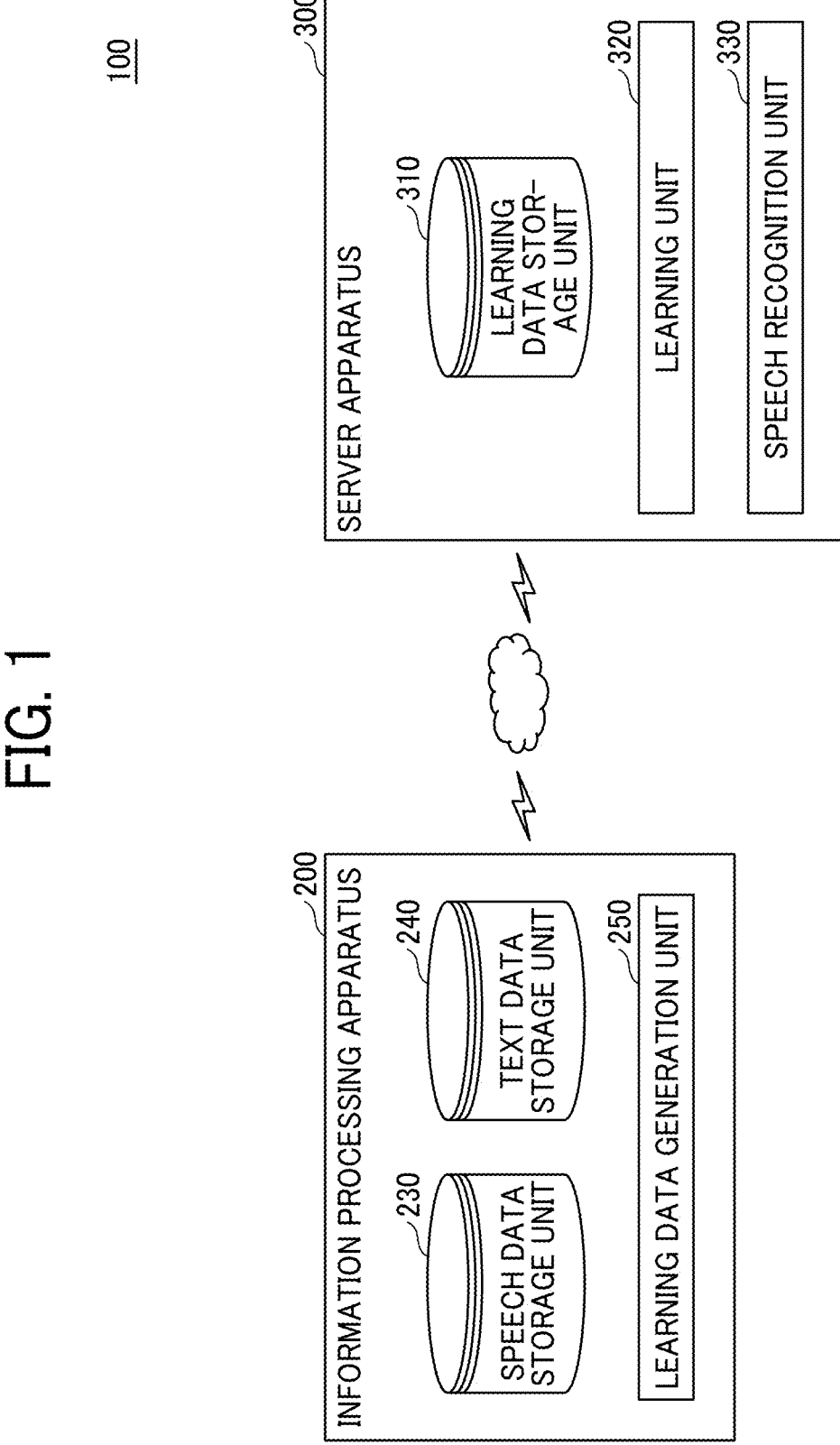
FIG. 1 is a diagram illustrating an example of a speech recognition system according to an exemplary embodiment of the disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. FIG. 1 is a diagram illustrating an example of a speech recognition system according to an exemplary embodiment of the disclosure.

A speech recognition system 100 according to the present embodiment is an example of an information processing system. The speech recognition system 100 includes an information processing apparatus 200 and a server apparatus 300. The information processing apparatus 200 and the server apparatus 300 are connected to each other via, for example, a network.

In the speech recognition system 100 according to the present embodiment, the information processing apparatus 200 generates learning data used for learning by a speech recognition unit 330, which is described later, and outputs the learning data to the server apparatus 300. The server apparatus 300 according to the present embodiment performs learning by the speech recognition unit 330 using the learning data generated by the information processing apparatus 200. The server apparatus 300 according to the present embodiment may be a cloud server.

The speech recognition unit 330 according to the present embodiment is a speech recognition device that performs speech recognition on speech data obtained in a state in which a distance between a mouth of a speaker and a sound collection device such as a microphone is equal to or greater than a certain distance. In the following description, such a state in which or a range of which a distance between a mouth of a speaker and a microphone is equal to or greater than a certain distance may be referred to as a "Far Field." The speech data obtained in the Far Field is, for example, speech data collected using a desktop microphone such as a boundary microphone.

The information processing apparatus 200 according to the present embodiment includes a speech data storage unit 230, a text data storage unit 240, and a learning data generation unit 250.

The speech data storage unit 230 stores speech data obtained under a predetermined condition. The predetermined condition indicates that a distance between a mouth of a speaker and a microphone that obtains the speech data is less than a certain distance. The certain distance may be, for example, about 1 meter. In the following description, such a state in which or a range of which a distance between a mouth of a speaker and a microphone is less than a certain distance may be referred to as a "Near Field."

With respect to the speech data obtained in the Near Field, because the distance between a speaker and a microphone is short, a signal-to-noise (SN) ratio of a speech is high, and content of the speech can be often clearly heard.

The definition of "speech data obtained in the Near Field" and the definition of "speech data obtained in the Far Field" in the present embodiment are described more specifically below.

As described above, in the present embodiment, the "speech data obtained in the Near Field" is speech data obtained under a predetermined condition.

In the present embodiment, an online conference system is used for obtaining speech data that satisfies a predetermined condition (speech data obtained in a range in which a distance between a mouth of a speaker and a microphone that obtains speech data is less than a predetermined distance).

Online conference is a remote conference implemented via an Internet line. The online conference system is a system for implementing a remote conference via an Internet line.

The online conference system may have a function of obtaining video image data, namely recording a video image, during a conference. In the present embodiment, the speech data representing a speech of a participant of a conference included in video image data obtained by a recording function of the online conference system is used as speech data obtained under a predetermined condition.

In other words, in the present embodiment, the speech data obtained by the online conference system is used as the speech data obtained in the Near Field.

Accordingly, the speech data stored in the speech data storage unit 230 according to the present embodiment can be said to be speech data obtained during a conference, in a system that implements a teleconference via an Internet line. At this time, the speech data may be obtained by a microphone (sound collection device) of a type worn by the user, such as a headset. In the present embodiment, for example, the speech data obtained by the online conference system may be stored in advance in the speech data storage unit 230 as the speech data obtained in the Near Field.

Other than the online conference system can be used for obtaining the speech data under the predetermined condition, as long as being determined in advance. For example, the speech data can be obtained under the predetermined condition by a device for recording a conversation between an operator and a user in a call center. At this time, the conversation between the operator and the user may be performed via an Internet line.

As described above, in the present embodiment, speech data obtained by a predetermined specific device is referred to as "speech data obtained in the Near Field."

On the other hand, the "speech data obtained in the Far Field" does not need to satisfy the predetermined condition in obtaining the speech data. Accordingly, the "speech data obtained in the Far Field" may be speech data obtained by a device other than the predetermined specific device.

The text data storage unit 240 stores text data input in a service for transmitting and receiving messages. In other words, the text data stored in the text data storage unit 240 is input by the user to a system that transmits and receives messages, and can be said to be text data in which content of a speech of the user is correctly reflected.

The service for transmitting and receiving messages is a service for implementing exchange (transmission and reception) of messages for the purpose of conversation or communication between two or more participants. Specifically, the service for transmitting and receiving messages may be implemented by, for example, a chat system in which a message close to a spoken language made by a speaker who is with little awareness of a microphone is exchanged.

The learning data generation unit 250 generates first learning data using the speech data stored in the speech data storage unit 230 and second learning data using the text data stored in the text data storage unit 240.

In other words, the learning data generation unit 250 generates learning data using the speech data in which the content of the speech is relatively clearly audible and learning data including the text data in which the content of the speech is correctly reflected. Then, the learning data generation unit 250 outputs the first learning data and the second learning data to the server apparatus 300 including the speech recognition unit 330. Details of the first learning data and the second learning data are described later.

The server apparatus 300 includes a learning data storage unit 310, a learning unit 320, and a speech recognition unit 330.

The learning data storage unit 310 stores third learning data used for learning by the speech recognition unit 330 by the learning unit 320.

The third learning data according to the present embodiment is stored in advance in the learning data storage unit 310. The third learning data according to the present embodiment is, for example, learning data created by an operator performing annotation on speech data obtained by a desktop microphone installed in a conference room in a face-to-face conference, for example.

In other words, the third learning data is a data set in which the speech data obtained by a device other than the predetermined specific device and the text data obtained by manually transcribing the speech data are associated with each other.

The learning unit 320 causes the speech recognition unit 330 to perform machine learning using the first learning data and the second learning data obtained from the information processing apparatus 200 and the third learning data stored in the learning data storage unit 310.

The speech recognition unit 330 is a speech recognition model that has performed learning using the first learning data, the second learning data, and the third learning data. In the example illustrated in FIG. 1, the speech recognition system 100 includes the information processing apparatus 200 and the server apparatus 300, but is not limited thereto. The speech recognition system 100 may be implemented by a single information processing apparatus.

The functional units of each of the information processing apparatus 200 and the server apparatus 300 according to the present embodiment may be implemented by a plurality of computers.

Figure 2:
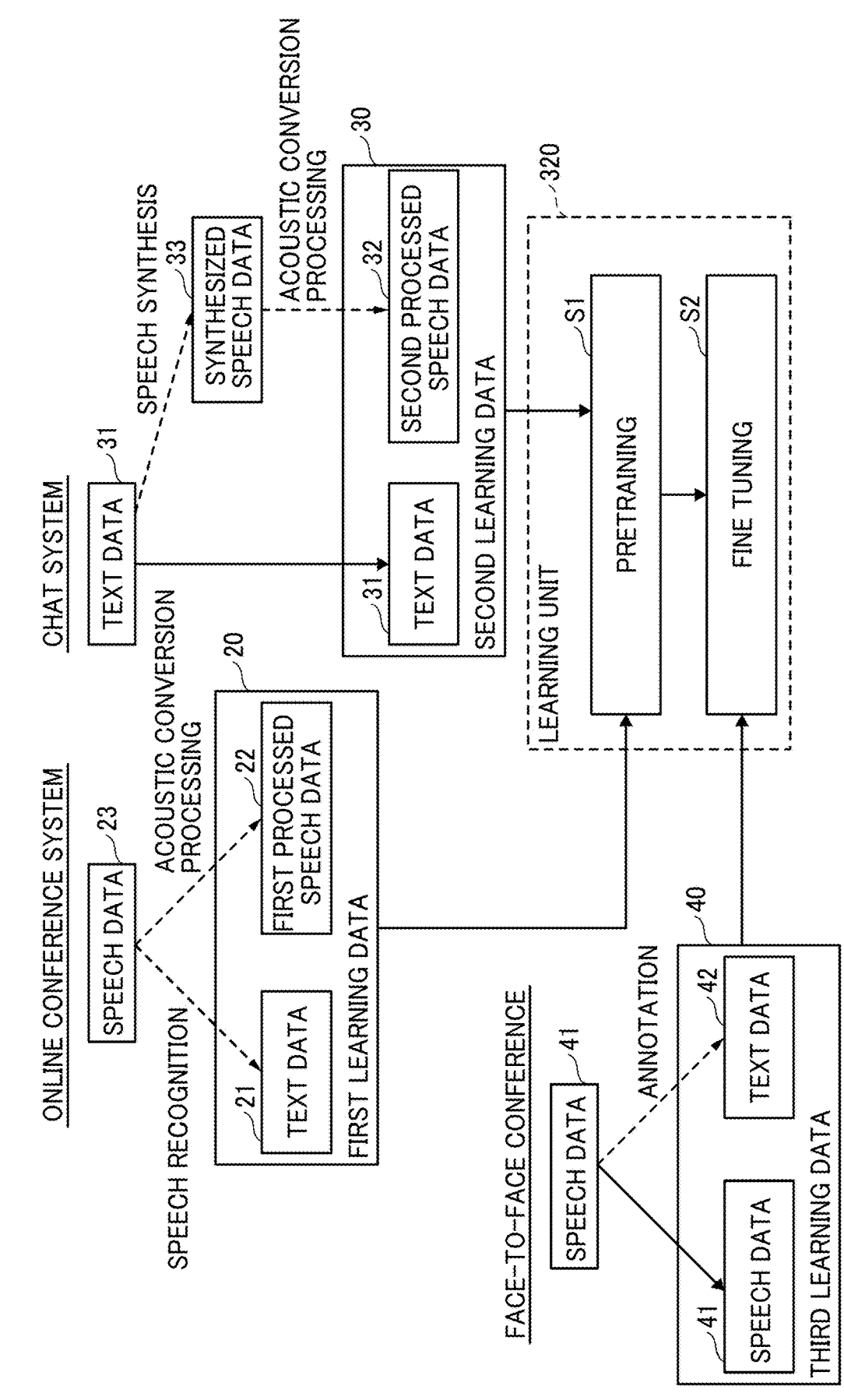
FIG. 2 is a diagram describing about learning data according to the exemplary embodiment of the disclosure.

Next, learning data in the present embodiment is described with reference to FIG. 2. FIG. 2 is a diagram describing about the learning data.

First learning data 20 according to the present embodiment is described. The first learning data 20 according to the present embodiment is a data set in which text data 21 and first processed speech data 22 are associated with each other.

The text data 21 is obtained as a result of speech recognition performed on speech data 23 recorded by, for example, an online conference system.

The speech data 23 is obtained during a conference in the online conference system (specific device) that implements a teleconference via the Internet. In other words, the speech data 23 is speech data obtained in the Near Field. Accordingly, the text data 21 can be said to be a speech recognition result, which is a result of speech recognition, having relatively high accuracy.

The first processed speech data 22 is speech data obtained by performing acoustic conversion processing on the speech data 23. The acoustic conversion processing according to the present embodiment is processing of converting speech data obtained in the Near Field into speech data corresponding to the speech data obtained in the Far Field.

As described above, in the first learning data 20, the text data 21, which is a relatively accurate speech recognition result, is associated with the first processed speech data 22, which is obtained by converting the speech data 23 into speech data corresponding to the speech data obtained in the Far Field.

Accordingly, it can be said that the first learning data 20 is useful learning data that matches a usage scene of the speech recognition unit 330 in learning by the speech recognition unit 330 that performs speech recognition on the speech data obtained in the Far Field.

The second learning data 30 according to the present embodiment is a data set in which text data 31 and the second processed speech data 32 are associated with each other. The text data 31 is obtained from, for example, a chat system. In other words, it can be said that the text data 31 is data in which content of a speech is correctly reflected.

The second processed speech data 32 is speech data obtained by performing acoustic conversion processing on synthesized speech data 33 generated based on the text data 31 by speech synthesis processing.

As described above, in the second learning data 30, the text data 31 in which the content of the speech is correctly reflected is associated with the second processed speech data 32 obtained by converting the synthesized speech data 33 generated based on the text data 31 into speech data corresponding to the speech data obtained in the Far Field.

Accordingly, it can be said that the second learning data 30 is useful learning data that matches a usage scene of the speech recognition unit 330 in learning by the speech recognition unit 330 that performs speech recognition on the speech data obtained in the Far Field.

Each of the first learning data 20 and the second learning data 30 are learning data on which an annotation operation is not performed.

Third learning data 40 is, for example, a data set in which speech data 41 obtained by, for example, a desktop microphone installed in a conference room and text data 42 created by annotation operation are associated with each other.

In other words, it can be said that the third learning data 40 is high accuracy learning data in which the content of the speech indicated by the speech data 41 and the content of the speech indicated by the text data 42 match.

When obtaining the first learning data 20 and the second learning data 30 from the information processing apparatus 200, the server apparatus 300 according to the present embodiment causes the speech recognition unit 330 to perform learning using at least one of the first learning data 20 and the second learning data 30 (step S1). In other words, pretraining according to the present embodiment is learning using learning data on which an annotation operation is not performed by an operator.

Next, the server apparatus 300 performs fine tuning for tuning a parameter using the third learning data 40 with respect to the speech recognition unit 330 that has finished pretraining. In other words, the fine tuning is learning performed using learning data on which an annotation operation is performed by an operator.

As described above, in the present embodiment, learning data useful for learning by the speech recognition unit 330 with respect to speech data obtained in the Far Field is automatically generated from a known system. Accordingly, in the present embodiment, a large amount of learning data can be easily collected.

In addition, in the present embodiment, since a large amount of learning data for pretraining can be collected at low cost, pretraining and fine tuning can be repeatedly performed. This results in improvement in the accuracy of speech recognition by the speech recognition unit 330.

Figure 3:
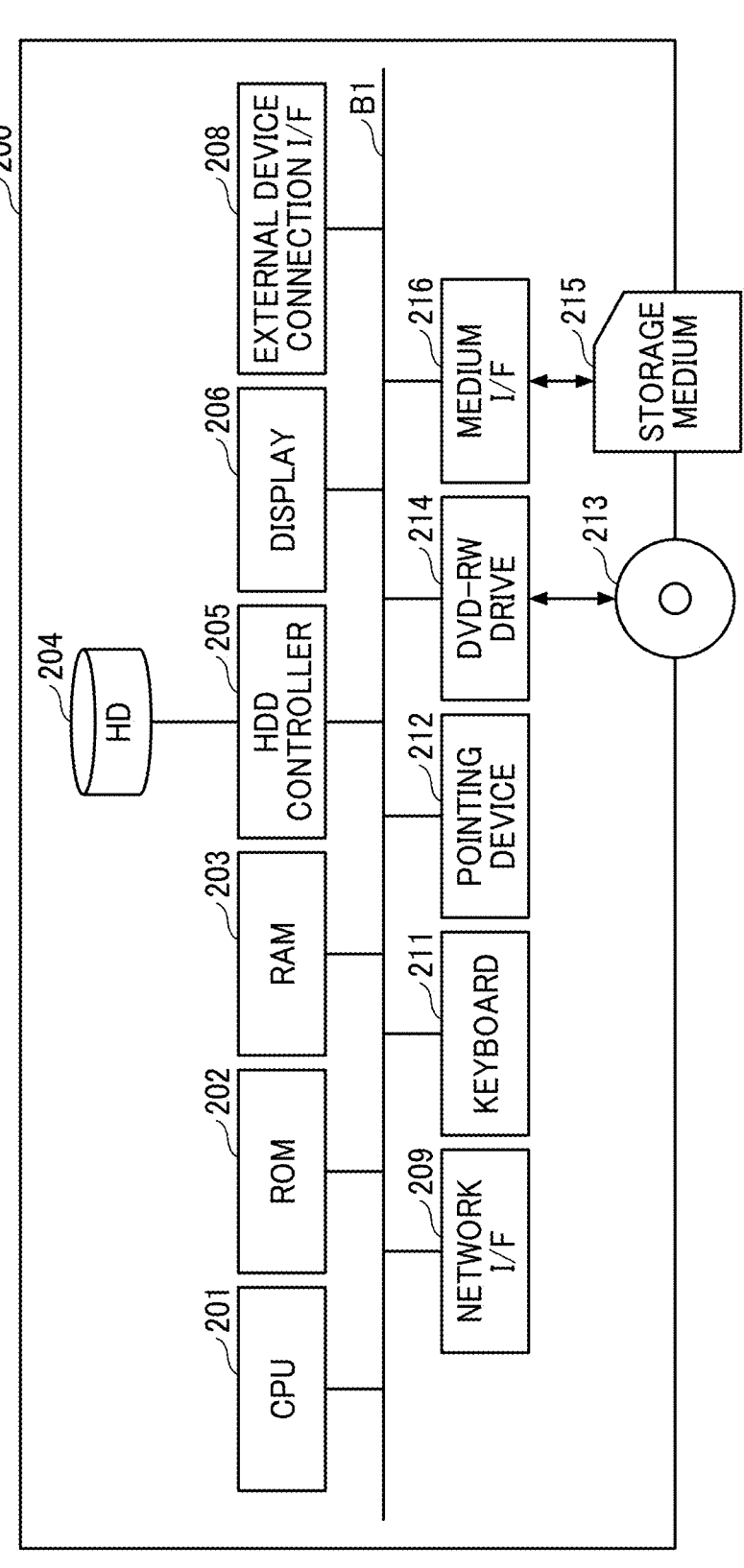
FIG. 3 is a block diagram illustrating an example of a hardware configuration of an information processing apparatus according to the exemplary embodiment of the disclosure.

A hardware configuration of the information processing apparatus 200 according to the present embodiment is described below with reference to FIG. 3. FIG. 3 is a block diagram illustrating an example of a hardware configuration of the information processing apparatus 200 according to the present embodiment of the disclosure.

As illustrated in FIG. 3, the information processing apparatus 200 includes a central processing unit (CPU) 201, a read only memory (ROM) 202, a random access memory (RAM) 203, a hard disk (HD) 204, a hard disk drive (HDD) controller 205, a display 206, an external device connection interface (I/F) 208, a network I/F 209, a bus line B1, a keyboard 211, a pointing device 212, a digital versatile disc rewritable (DVD-RW) drive 214, and a media I/F 216.

The CPU 201 controls the overall operation of the information processing apparatus 200. The ROM 202 stores a program such as an initial program loader (IPL) used for driving the CPU 201. The RAM 203 is used as a work area for the CPU 201. The HD 204 stores various data such as a control program. The HDD controller 205 controls reading and writing of various data from and to the HD 204 under control of the CPU 201.

The display (display device) 206 displays various kinds of information such as a cursor, a menu, a window, characters, or an image. The external device connection I/F 208 is an interface for connecting various external devices. Examples of the external devices include, but not limited to, a universal serial bus (USB) memory and a printer. The network I/F 209 is an interface for performing data communication using a communication network. The bus line B1 is an address bus or a data bus, which electrically connects the components illustrated in FIG. 3 such as the CPU 201.

The keyboard 211 is an example of an input device provided with a plurality of keys for allowing a user to input characters, numerals, or various instructions. The pointing device 212 is an example of an input device that allows a user to select or execute a specific instruction, select a target for processing, or move a cursor being displayed. The DVD-RW drive 214 reads or writes various data from or to a DVD-RW 213, which is an example of a removable storage medium. The removable storage medium is not limited to the DVD-RW and may be a digital versatile disc-recordable (DVD-R) or the like. The media I/F 216 controls reading or writing (storing) with respect to a recording medium 215 such as a flash memory.

The hardware configuration of the server apparatus 300 of the present embodiment is substantially the same as that of the information processing apparatus 200, and the description thereof is omitted here.

Next, the third learning data 40 stored in the learning data storage unit 310 of the server apparatus 300 according to the present embodiment is described with reference to FIG. 4. FIG. 4 is a diagram illustrating an example of third learning data.

The third learning data 40 according to the present embodiment includes information items of speech ID, a start time, end time, and speech content, and the item "speech ID" and other items are associated with each other.

The value of the item of "speech ID" is identification information for identifying speech data obtained in a speech period specified by the start time and the end time. The speech period indicates a period in which a speech is performed.

The values of the items of "start time" and "end time" indicate a start time of a speech period and an end time of a speech period, respectively. The value of the item of "speech content" is text data transcribed from the speech data identified by the speech ID.

In the present embodiment, the third learning data 40 created in advance is stored in the learning data storage unit 310 of the server apparatus 300.

Next, functions of devices included in the speech recognition system 100 according to the present embodiment are described with reference to FIG. 5.

Figure 5:
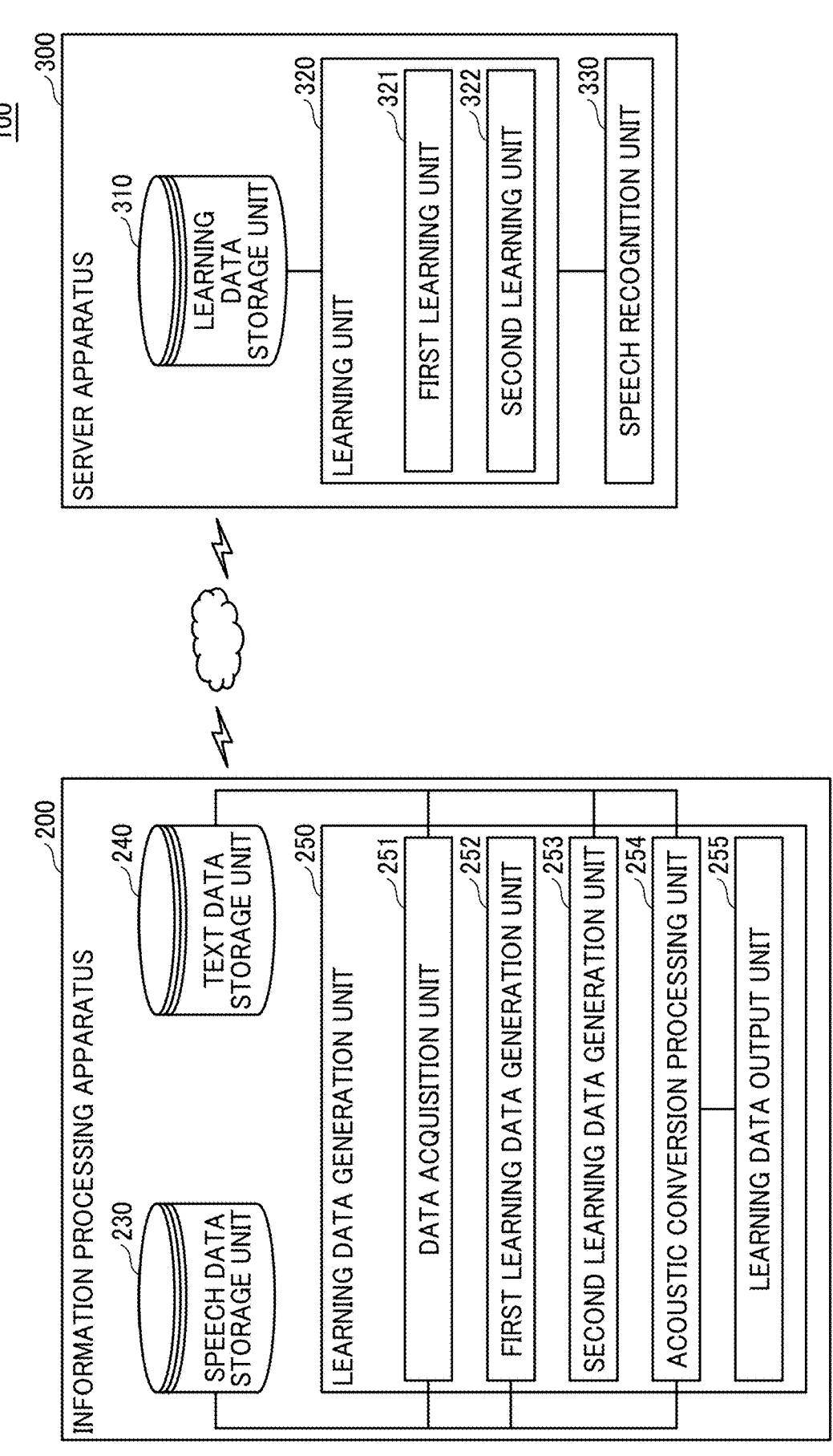
FIG. 5 is a block diagram illustrating a functional configuration of each device included in the speech recognition system according to the exemplary embodiment of the disclosure.

FIG. 5 is a block diagram illustrating a functional configuration of each device included in the speech recognition system.

Functional units of the information processing apparatus 200 are described below. The information processing apparatus 200 according to the present embodiment includes a speech data storage unit 230, a text data storage unit 240, and a learning data generation unit 250. The speech data storage unit 230 and the text data storage unit 240 are implemented by, for example, a storage device such as the RAM 203. The learning data generation unit 250 is implemented by the CPU 201 reading and executing a program stored in a storage device such as the HD 204.

The speech data storage unit 230 stores, for example, the speech data 23 obtained from, for example, an online conference system. For example, the text data 31 obtained from, for example, a chat system is stored in the text data storage unit 240.

The learning data generation unit 250 includes a data acquisition unit 251, a first learning data generation unit 252, a second learning data generation unit 253, an acoustic conversion processing unit 254, and a learning data output unit 255.

The data acquisition unit 251 obtains the speech data 23 from, for example, an online conference system that can communicate with the information processing apparatus 200, and stores the speech data 23 in the speech data storage unit 230. In addition, the data acquisition unit 251 obtains the text data 31 from, for example, a chat system that communicates with the information processing apparatus 200, and stores the text data 31 in the text data storage unit 240. The speech data 23 and the text data 31 may be stored in the speech data storage unit 230 and the text data storage unit 240, respectively, by, for example, an administrator of the speech recognition system 100.

The first learning data generation unit 252 generates the first learning data 20. Specifically, first learning data generation unit 252 obtains speech data 23 from the speech data storage unit 230, performs speech recognition, and generates the text data 21. In addition, the first learning data generation unit 252 performs acoustic conversion processing on the speech data 23 by the acoustic conversion processing unit 254 to obtain the first processed speech data 22. Then, the first learning data generation unit 252 generates the first learning data 20 that is a data set in which the text data 21 and the first processed speech data 22 are associated with each other.

The second learning data generation unit 253 generates the second learning data 30. Specifically, the second learning data generation unit 253 obtains the text data 31 from the text data storage unit 240, performs speech synthesis processing, and generates the synthesized speech data 33. In addition, the second learning data generation unit 253 performs the acoustic conversion processing on the synthesized speech data 33 by the acoustic conversion processing unit 254 to obtain the second processed speech data 32. Then, the second learning data generation unit 253 generates the second learning data 30 that is a data set in which the text data 31 and the second processed speech data 32 are associated with each other.

The acoustic conversion processing unit 254 performs processing of converting speech data obtained in the Near Field into speech data corresponding to speech data obtained in the Far Field. Specifically, the acoustic conversion processing unit 254 may perform processing of adding artificial noise or artificial impulse response (reverberation) to the speech data obtained in the Near Field.

In addition, for example, speech data obtained by reproducing speech data obtained in the Near Field by a speaker and recording speech data reproduced by a microphone arranged at a place away from the speaker by a predetermined distance or more may be set as speech data corresponding to the speech data obtained in the Far Field.

The learning data output unit 255 outputs the first learning data 20 and the second learning data 30 generated by the first learning data generation unit 252 and the second learning data generation unit 253, respectively, to the server apparatus 300.

Functions of the server apparatus 300 are described below. The server apparatus 300 according to the present embodiment includes the learning data storage unit 310, the learning unit 320, and the speech recognition unit 330. The learning data storage unit 310 may be implemented by, for example, a storage device included in the server apparatus 300. The learning unit 320 and the speech recognition unit 330 are implemented by the CPU included in the server apparatus 300 reading and executing a program stored in a storage device.

The learning unit 320 causes the speech recognition unit 330 to perform learning using the learning data stored in the learning data storage unit 310. Specifically, the learning unit 320 includes a first learning unit 321 and a second learning unit 322. The first learning data 20 and the second learning data 30 obtained from the information processing apparatus 200 may also be stored in the learning data storage unit 310.

The first learning unit 321 causes the speech recognition unit 330 to perform pretraining using one or both of the first learning data 20 and the second learning data 30. The second learning unit 322 causes the speech recognition unit 330 to perform fine tuning using the third learning data 40.

The speech recognition unit 330 performs speech recognition processing for converting speech data into text data.

Figure 6:
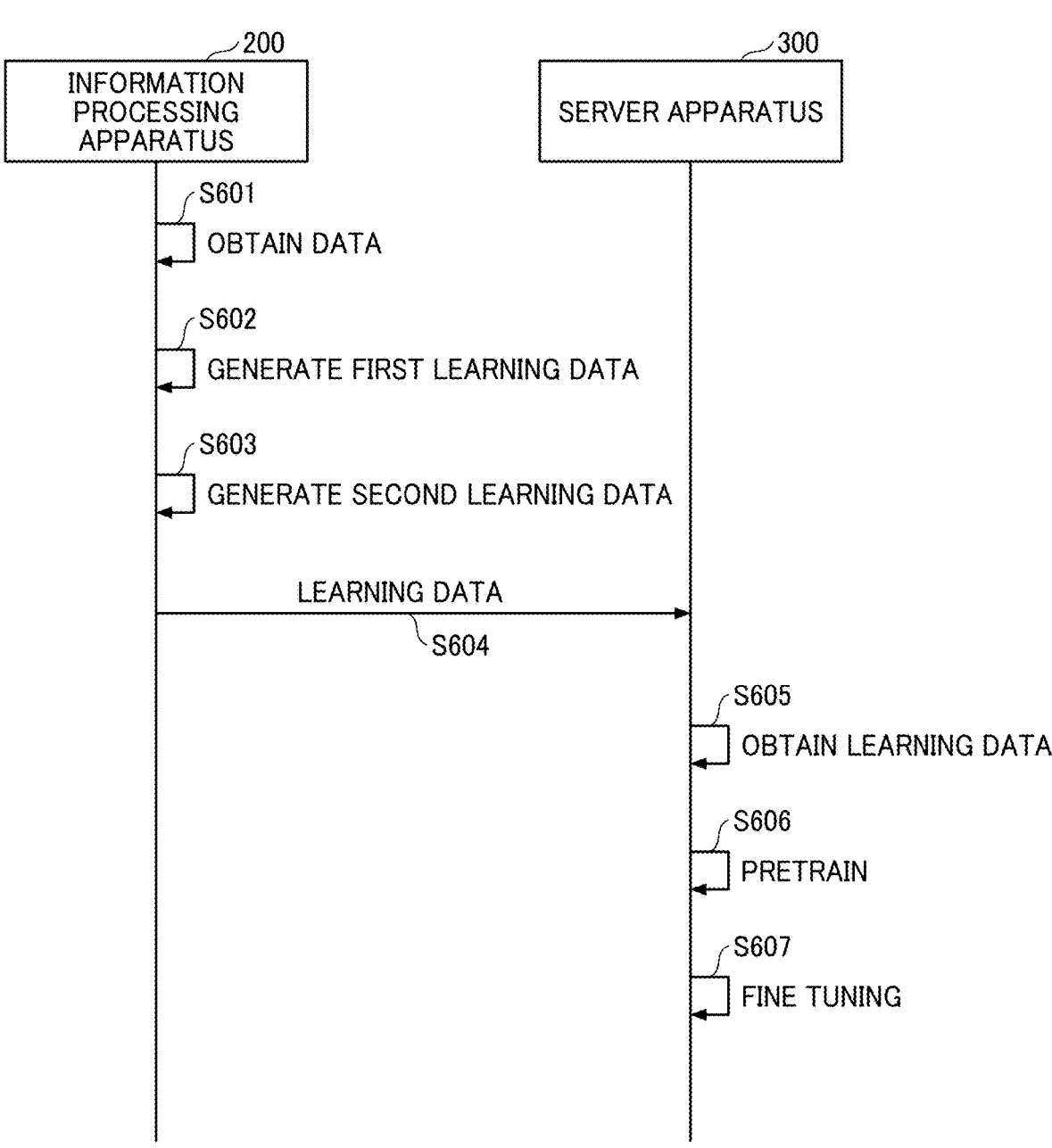
FIG. 6 is a sequence diagram illustrating an example of a process performed by the speech recognition system according to the exemplary embodiment of the disclosure.

Next, a process performed by the speech recognition system 100 according to the present embodiment is described with reference to FIG. 6. FIG. 6 is a sequence diagram illustrating an example of a process performed by a speech recognition system. In the example of FIG. 6, a process in a case where the speech recognition unit 330 according to the present embodiment is caused to perform learning is described.

In the speech recognition system 100 according to the present embodiment, the learning data generation unit 250 of the information processing apparatus 200 obtains the speech data 23 and the text data 31 from a known online system or a known chat system by the data acquisition unit 251, and stores the speech data 23 and the text data 31 in the speech data storage unit 230 and the text data storage unit 240, respectively.

Subsequently, the learning data generation unit 250 causes the first learning data generation unit 252 to generate the first learning data 20 (step S602). Subsequently, the learning data generation unit 250 causes the second learning data generation unit 253 to generate the second learning data 30 (step S603). Details of the processing of step S602 and step S603 are described later.

Subsequently, the learning data generation unit 250 outputs the generated first learning data 20 and second learning data 30 to the server apparatus 300 by the learning data output unit 255 (step S604).

The server apparatus 300 obtains the first learning data 20 and the second learning data 30 output from the information processing apparatus 200 and stores the first learning data 20 and the second learning data 30 in the learning data storage unit 310 (step S605).

Subsequently, the server apparatus 300 causes the first learning unit 321 of the learning unit 320 to cause the speech recognition unit 330 to perform pretraining using at least one of the first learning data 20 and the second learning data 30 (step S606).

Subsequently, the server apparatus 300 causes the second learning unit 322 to cause the speech recognition unit 330 to perform fine tuning using the third learning data 40 stored in the learning data storage unit 310 (step S607).

In the speech recognition system 100 according to the present embodiment, the accuracy of speech recognition by the speech recognition unit 330 is improved by repeating the process illustrated in FIG. 6.

For example, a speech recognition model that implements the speech recognition unit 330 according to the present embodiment is generated in initial pretraining, and then updated by fine tuning. In the next pretraining, the speech recognition model after the fine tuning is subjected to further fine tuning.

In the present embodiment, the accuracy of the speech recognition model is gradually improved by repeating learning in this way. Accordingly, according to the present embodiment, the accuracy of speech recognition for the speech data obtained in the Far Field can be improved.

Next, processes performed by the first learning data generation unit 252 and the second learning data generation unit 253 are described below with reference to FIGS. 7 and 8.

FIG. 7 is a flowchart illustrating a process performed by the first learning data generation unit 252. FIG. 7 illustrates details of the processing of step S602 in FIG. 6.

The first learning data generation unit 252 according to the present embodiment obtains the speech data 23 from the speech data storage unit 230 (step S701). Subsequently, the first learning data generation unit 252 performs speech recognition on the obtained speech data 23 and obtains the text data 21 (step S702).

Subsequently, the first learning data generation unit 252 causes the acoustic conversion processing unit 254 to perform acoustic conversion processing on the speech data 23 to generate the first processed speech data 22 (step S703).

Subsequently, the first learning data generation unit 252 sets a data set in which the text data 21 and the first processed speech data 22 are associated with each other as the first learning data 20 (step S704), and passes the data set to the learning data output unit 255.

FIG. 8 is a flowchart illustrating a process performed by the second learning data generation unit 253. FIG. 8 illustrates details of the processing of step S603 in FIG. 6.

The second learning data generation unit 253 according to the present embodiment obtains the text data 31 from the text data storage unit 240 (step S801). Subsequently, the second learning data generation unit 253 performs speech synthesis processing on the obtained text data 31 to generate the synthesized speech data 33 (step S802).

Subsequently, the second learning data generation unit 253 causes the acoustic conversion processing unit 254 to perform acoustic conversion processing on the synthesized speech data 33 to generate the second processed speech data 32 (step S803).

Subsequently, the second learning data generation unit 253 sets a data set in which the text data 31 and the second processed speech data 32 are associated with each other as the second learning data 30 (step S804), and passes the data set to the learning data output unit 255.

The processing of the first learning data generation unit 252 and the second learning data generation unit 253 is described above.

In the present embodiment, as described above, the first learning data 20 and the second learning data 30 can be automatically generated. Accordingly, in the present embodiment, time and effort related to collection of learning data suitable for learning by the speech recognition unit 330 can be reduced, and a large amount of learning data used for pretraining can be collected at low cost.

In the present embodiment, the learning unit 320 may perform the pretraining using one of the first learning data 20 and the second learning data 30, or may perform the pretraining using both the first learning data 20 and the second learning data 30.

In addition, the first learning data 20 and the second learning data 30 according to the present embodiment may be used for fine tuning, for example, when degree of matching between content of a speech indicated by the processed speech data and content of a speech indicated by the text data is almost the same as that of the third learning data 40.

Next, a specific usage scene of the speech recognition system 100 according to the present embodiment is described with reference to FIGS. 9 and 10.

Figure 9:
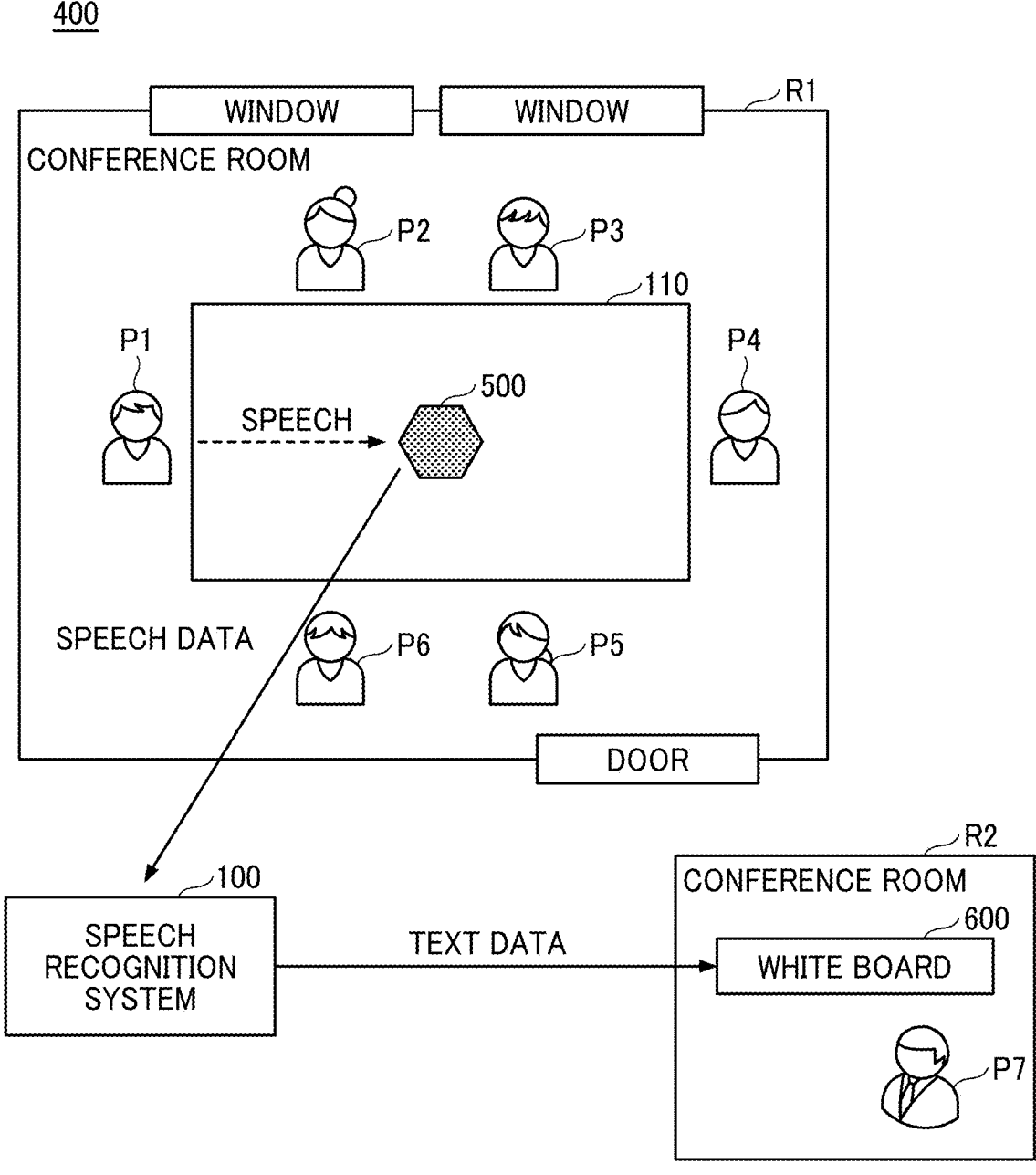
FIG. 9 is a diagram illustrating an example of a usage scene of the speech recognition system according to the exemplary embodiment of the disclosure.

FIG. 9 is a diagram illustrating an example of a usage scene of the speech recognition system. In this example, the speech recognition system 100 is used for a teleconference system.

The teleconference system 400 according to the present embodiment converts speech data obtained by a desktop microphone 500 arranged on a table of a conference room R1 into text data and displays the text data on an electronic whiteboard 600 installed in a conference room R1 geographically separated from a conference room R2. For example, the desktop microphone 500 may be installed in the conference room R1 of a business office located in A city, A prefecture, and the electronic whiteboard 600 may be installed in the conference room R2 of a business office located in B city, B prefecture.

The desktop microphone 500 may be a general sound collection device and may include a storage device that stores collected speech data and a communication device that transmits the speech data to the speech recognition system 100.

The electronic whiteboard 600 includes, for example, a large-sized display with a touch panel, detects coordinates on a board surface indicated by a user, connects the coordinates, and displays a stroke, and is an example of a display device. The electronic whiteboard 600 may also be referred to as an electronic information board or an electronic board.

The desktop microphone 500 is arranged at the center of the table installed in the conference room R1, and participants P1 to P6 participate in the conference. The desktop microphone 500 is disposed at a position away from the mouth of each of the participants P1 to P6 by a predetermined distance or more.

Accordingly, the speech data obtained by the desktop microphone 500 is speech data obtained in the Far Field.

In the speech recognition system 100 according to the present embodiment, the speech data of the participants P1 to P6 obtained by the desktop microphone 500 is input to the speech recognition unit 330 included in the speech recognition system 100, and speech recognition is performed by the speech recognition unit 330. Then, the speech recognition system 100 causes the electronic whiteboard 600 arranged in the conference room R2 to display the text data that is the speech recognition result.

In the teleconference system 400, each of the desktop microphone 500 and the electronic whiteboard 600 can communicate with the server apparatus 300 included in the speech recognition system 100.

The speech recognition unit 330 is a speech recognition model in which learning is performed using learning data generated by the information processing apparatus 200, and accuracy of speech recognition with respect to speech data obtained in the Far Field is improved by the learning.

Accordingly, in the present embodiment, for example, in the conference room R1, even when the participant P4 sitting at a position farthest from the desktop microphone 500 performs a presentation, the content of the speech can be converted into text data with high accuracy and displayed on the electronic whiteboard 600.

Although the text data is displayed on the electronic whiteboard 600 in FIG. 9, the present disclosure is not limited thereto. In the present embodiment, any device having a function of receiving the text data and a function of displaying the text data can be used in alternative to the electronic whiteboard 600.

In the present embodiment, the text data as a result of speech recognition by the speech recognition system 100 is displayed, but the present disclosure is not limited to this. The text data as a result of speech recognition by the speech recognition system 100 may be stored in the server apparatus 300 of the speech recognition system 100 as minutes data, for example. As described above, in the present embodiment, even the speech data obtained in the Far Field can be converted into the text data to be used as the minutes data.

In the example of FIG. 9, the speech data of a speaker is collected by the desktop microphone 500, but the present disclosure is not limited thereto. In the present embodiment, any device that has a function of collecting speech data of a speaker and transmits the speech data to the speech recognition system 100 can be used in alternative to the desktop microphone 500.

Figure 10:
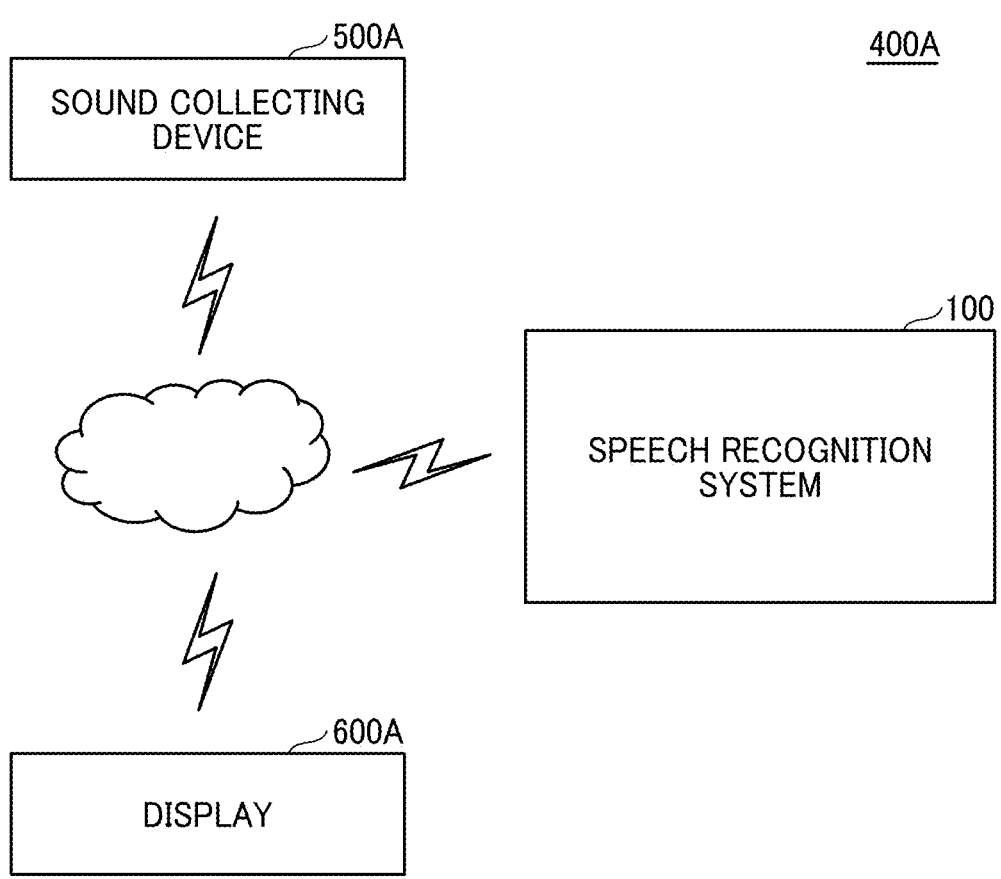
FIG. 10 is a diagram illustrating another example of a usage scene of the speech recognition system according to the exemplary embodiment of the disclosure.

FIG. 10 is a diagram illustrating another example of a usage scene of the speech recognition system. In the example of FIG. 10, the speech recognition system 100 is used for a monitoring system 400A.

The monitoring system 400A according to the present embodiment includes the speech recognition system 100, a sound collection device 500A, and a display 600A that are connected to each other via a network.

The sound collection device 500A may be, for example, a microphone that is provided in, for example, a room of a medical facility and a room of a care facility and obtains speech (voice) of a person to be monitored. In addition, the sound collection device 500A is provided at a position away from the person to be monitored by a distance equal to or greater than a predetermined distance.

The person to be monitored may be, for example, a patient admitted to a medical institution or a resident in a care facility. The person to be monitored may be a person who is isolated in a private room for some reason.

The display 600A is viewed by, for example, a medical worker or a member of nursing staff, and may be provided in, for example, a nurse station. The display 600A may be, for example, a device owned by, for example, a family or a relative of the person to be monitored.

In the present embodiment, in response to receiving speech data from the sound collection device 500A, the speech recognition system 100 performs speech recognition based on the speech data and displays text data corresponding to a recognition result on the display 600A.

At this time, in the speech recognition system 100, the accuracy of speech recognition with respect to the speech data obtained in the Far Field is improved by learning.

Accordingly, in the present embodiment, text having a high matching degree with respect to the content uttered without being aware of the sound collection device 500A by the person to be monitored can be output.

In the monitoring system 400A, in alternative to the sound collection device 500A, an imaging device that obtains video image data including sound may be used. In this case, the speech recognition system 100 may display text data, which is a result of speech recognition, superimposed on the video image data.

In this way, in the present embodiment, the content uttered by the person to be monitored can be output as text data based on the speech data of the person to be monitored. In addition, in the present embodiment, for example, even when the pronunciation of the person or what the person said is unclear, performing speech recognition with high accuracy allows the others to get the content uttered by the person.

In addition, the speech recognition system 100 may determine whether the person is in a situation of needing assistance or not based on the content of the text data, which is the result of the speech recognition. When the person is in such a situation, the information processing apparatus 200 may output a notice or a warning to the display 600A together with the text data.

Furthermore, the usage scenes of the speech recognition system 100 is not limited to the above-described teleconference system 400 and the above-described monitoring system 400A. For example, the speech recognition system 100 may be a management system that receives speech data obtained by recording a conversation between an operator of a call center and a user of the call center as an input and stores text data obtained as a result of speech recognition as call record data.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses or devices described in the embodiments described above are merely one example of plural computing environments that implement one or more embodiments of the disclosure.

In some embodiments, the information processing apparatus 200 includes multiple computing devices, such as a server cluster. The multiple computing devices are configured to communicate with one another through any type of communication link, including a network, a shared memory, etc., and perform the processes disclosed herein. In substantially the same manner, for example, the information processing apparatus 200 includes such multiple computing devices configured to communicate with one another.

Further, the speech recognition system 100 can be configured to share the disclosed processes in various combinations. For example, a process executed by the information processing apparatus 200 or the server apparatus 300 may be executed by another server apparatus. Similarly, each function of the information processing apparatus 200 or the server apparatus 300 may be performed by another information processing apparatus. Each element of the information processing apparatus 200 and another information processing apparatus may be integrated into a single information processing apparatus or may be divided into a plurality of devices.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

In a related art, in a case a speaker speaks in a tone in which the speaker is not aware of the microphone or where a distance from the mouth of the speaker to a microphone is a certain distance or more, speech recognition with high accuracy may failed to be successfully performed. To cope with this, a speech recognizer that perform learning to improve the accuracy of speech recognition is desired, However, for learning, a large amount of learning data that is not easily collected is required.

According to an embodiment of the disclosure, collection of learning data is assisted.

The invention claimed is:

1. An information processing method, comprising:

generating first learning data from first audio data acquired based on a distance between a microphone and a speaker;

generating second learning data using text data that is independent from the first audio data;

storing third learning data corresponding to a speech recognition usage environment by pairing second audio data that is different from the first audio data with annotated text data corresponding to the second audio data;

performing pre-training of a speech recognition model using the first learning data and the second learning data to generate a first speech recognition model, the pre-training being performed independently of the speech recognition usage environment;

performing training by modifying parameters of the first speech recognition model based on the third learning data corresponding to the speech recognition usage environment to generate a second speech recognition model; and performing speech recognition on sampled audio data from the speech recognition usage environment using the second speech recognition model and generating recognized text data.

2. The information processing method according to claim 1, further comprising:

obtaining the first audio data using a first microphone which is less than a predetermined distance from a mouth of the speaker;

obtaining the text data from a received text message; and obtaining the second audio data using a second microphone which is greater than a predetermined distance from the mouth of the speaker.

3. The information processing method of claim 2, wherein:

the obtaining the first audio data utilizes a system that implements a remote conference via the Internet.

4. The information processing method of claim 3, wherein:

the obtaining the second audio data utilizes a system that implements a face-to-face conference.

5. A non-transitory recording medium storing a plurality of instructions which, when executed by one or more processors, causes the processors to perform a method, the method comprising:

generating first learning data from first audio data acquired based on a distance between a microphone and a speaker;

generating second learning data using text data that is independent of the first audio data;

storing third learning data corresponding to a speech recognition usage environment by pairing second audio data that is different from the first audio data with annotated text data corresponding to the second audio data;

performing pre-training of a speech recognition model using the first learning data and the second learning data to generate a first speech recognition model, the pre-training being performed independently of the speech recognition usage environment;

performing by modifying parameters of the first speech recognition model based on the third learning data corresponding to the speech recognition usage environment to generate a second speech recognition model; and performing speech recognition on sampled audio data from the speech recognition usage environment using the second speech recognition model and generating recognized text data.

6. The non-transitory recording medium according to claim 5, wherein the method further comprises:

obtaining the first audio data using a first microphone which is less than a predetermined distance from a mouth of the speaker;

obtaining the text data from a received text message; and obtaining the second audio data using a second microphone which is greater than a predetermined distance from the mouth of the speaker.

7. The non-transitory recording medium according to claim 6, wherein:

the obtaining the first audio data utilizes a system that implements a remote conference via the Internet.

8. The non-transitory recording medium according to claim 7, wherein:

the obtaining the second audio data utilizes a system that implements a face-to-face conference.

9. An information processing system, comprising:

circuitry configured to:

generate first learning data from first audio data acquired based on a distance between a microphone and a speaker;

generate second learning data using text data that is independent of the first audio data;

store third learning data corresponding to a speech recognition usage environment by pairing second audio data that is different from the first audio data with annotated text data corresponding to the second audio data;

perform pre-training of a speech recognition model using the first learning data and the second learning data to generate a first speech recognition model, the pre-training being performed independently of the speech recognition usage environment;

perform training by modifying parameters of the first speech recognition model based on the third learning data corresponding to the speech recognition usage environment to generate a second speech recognition model; and perform speech recognition on sampled audio data from the speech recognition usage environment using the second speech recognition model and generate recognized text data.

10. The information processing system according to claim 9, wherein the circuitry is further configured to:

obtain the first audio data using a first microphone which is less than a predetermined distance from a mouth of the speaker;

obtain the text data from a received text message; and obtain the second audio data using a second microphone which is greater than a predetermined distance from the mouth of the speaker.

11. The information processing system according to claim 10, wherein:

the obtaining the first audio data utilizes a remote conference system using the Internet.

12. The information processing system according to claim 11, wherein:

the obtaining the second audio data utilizes a system that implements a face-to-face conference.

* * * * *